(12) United States Patent
De La Torre

(10) Patent No.: US 12,391,169 B1
(45) Date of Patent: Aug. 19, 2025

(54) ADJUSTABLE HEADLIGHT DEVICE

(71) Applicant: Alexandro De La Torre, Memphis, TN (US)

(72) Inventor: Alexandro De La Torre, Memphis, TN (US)

( * ) Notice: Subject to any disclaimer, the term of this patent is extended or adjusted under 35 U.S.C. 154(b) by 0 days.

(21) Appl. No.: 18/640,677

(22) Filed: Apr. 19, 2024

(51) Int. Cl.
  *B60Q 1/11* (2006.01)
  *B60Q 1/04* (2006.01)
  *B60Q 1/076* (2006.01)

(52) U.S. Cl.
  CPC .............. *B60Q 1/11* (2013.01); *B60Q 1/0441* (2013.01); *B60Q 1/076* (2013.01); *B60Q 2300/132* (2013.01)

(58) Field of Classification Search
  CPC ........ B60Q 1/11; B60Q 1/0441; B60Q 1/076; B60Q 2300/132
  See application file for complete search history.

(56) References Cited

U.S. PATENT DOCUMENTS

| | | |
|---|---|---|
| D529,208 S | 9/2006 | Ikeda |
| 9,868,386 B2 | 1/2018 | Kamitani |
| 10,471,885 B2 | 11/2019 | Ohsawa |
| 10,752,163 B2 | 8/2020 | Kim |
| 10,787,115 B1 | 9/2020 | Scanlon |
| 11,084,417 B2 | 8/2021 | Buhmann |
| 2003/0076045 A1* | 4/2003 | Toda ............... B60Q 1/115 315/77 |
| 2016/0001695 A1 | 1/2016 | Fennelly |
| 2022/0297780 A1 | 9/2022 | Wang |

FOREIGN PATENT DOCUMENTS

WO  WO2013080614  6/2013

* cited by examiner

*Primary Examiner* — James R Greece
*Assistant Examiner* — Jose M Diaz

(57) ABSTRACT

An adjustable headlight device for automatically adjusting an angle of headlights includes a headlight housing that is mountable in a headlight space in a forward end of a vehicle. A pair of headlights is pivotally disposed within the headlight housing thereby facilitating each of the pair of headlights to be positioned at a variety of angles in the headlight housing. A tilting unit is integrated into the headlight housing to tilt each of the pair of headlight upwardly or downwardly. A control unit is integrated into the headlight housing to sense an angle of the vehicle with respect to a horizontal plane. The control unit actuates the tilting unit to tilt the pair of headlights to emit light downwardly onto a roadway at an optimum angle for enhancing visibility of the driver.

12 Claims, 8 Drawing Sheets

ADJUSTABLE HEADLIGHT DEVICE

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to headlight devices and more particularly pertains to a new headlight device for adjusting an angle of headlights. The device includes a headlight housing and a pair of headlights pivotally mounted in the headlight housing and a tilting unit integrated into the headlight housing for tilting the headlights upwardly or downwardly to optimize visibility for a driver.

(2) Description of Related Art Including Information Disclosed Under 37 CFR 1.97 and 1.98

The prior art relates to headlight devices including a variety of adjustable headlight devices that each includes an accelerometer and a tilting unit for tilting headlights according to acceleration of a vehicle and a variety of adjustable headlight devices that each includes a distance sensor and a tilting unit for tilting headlights according to a distance between a pair of vehicles. In no instance does the prior art disclose an adjustable headlight device that includes a pair of headlights pivotally disposed in a headlight housing and a control unit that senses that angle of a vehicle with respect to a horizontal plane and a tilting unit integrated into the headlight housing for tilting the headlights upwardly or downwardly according to the angle at which the vehicle is oriented.

BRIEF SUMMARY OF THE INVENTION

An embodiment of the disclosure meets the needs presented above by generally comprising a headlight housing that is mountable in a headlight space in a forward end of a vehicle. A pair of headlights is pivotally disposed within the headlight housing thereby facilitating each of the pair of headlights to be positioned at a variety of angles in the headlight housing. A tilting unit is integrated into the headlight housing to tilt each of the pair of headlight upwardly or downwardly. A control unit is integrated into the headlight housing to sense an angle of the vehicle with respect to a horizontal plane. The control unit actuates the tilting unit to tilt the pair of headlights to emit light downwardly onto a roadway at an optimum angle for enhancing visibility of the driver.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
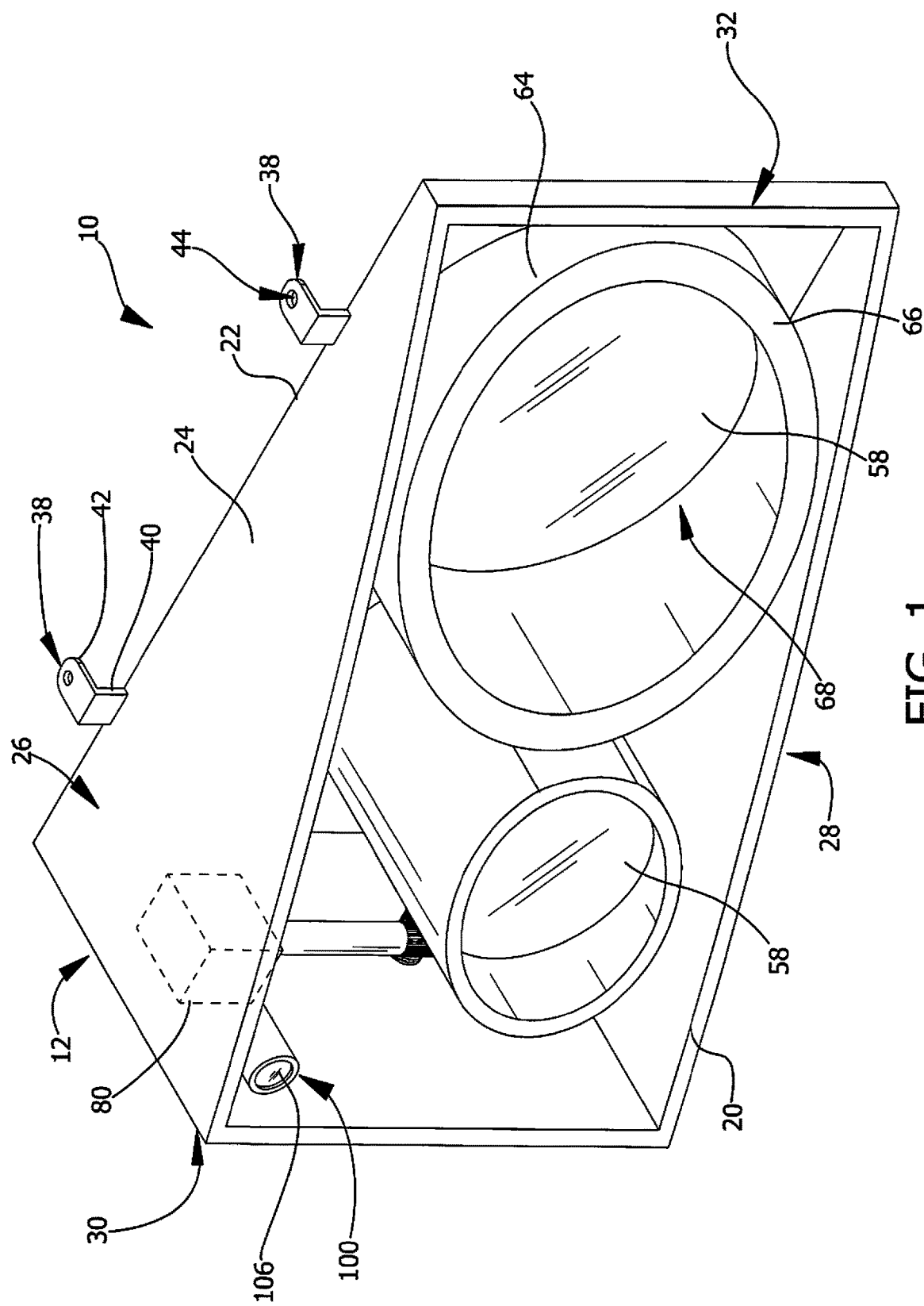
FIG. 1 is a front perspective view of an adjustable headlight device according to an embodiment of the disclosure.
Figure 2:
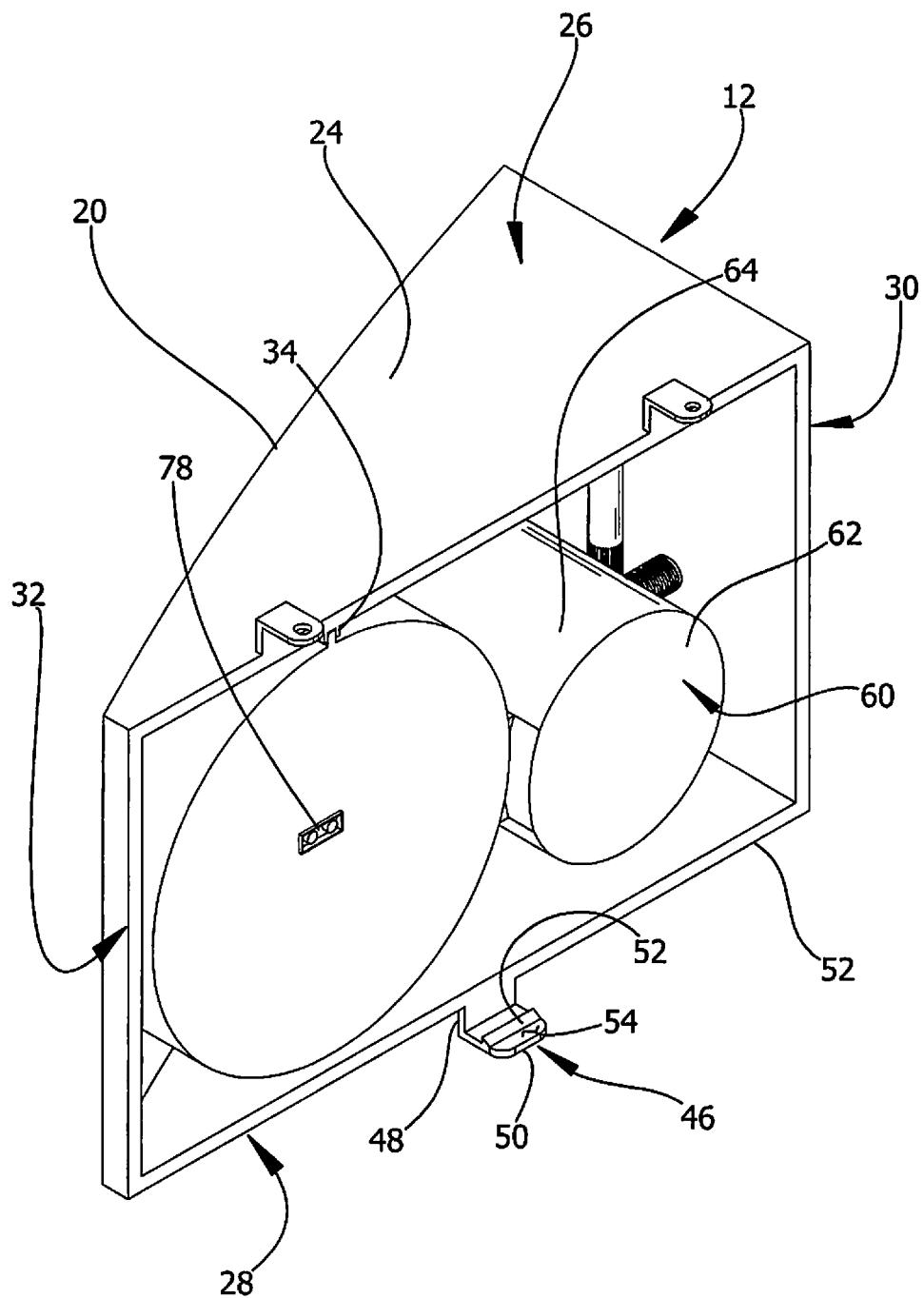
FIG. 2 is a back perspective view of an embodiment of the disclosure.
Figure 3:
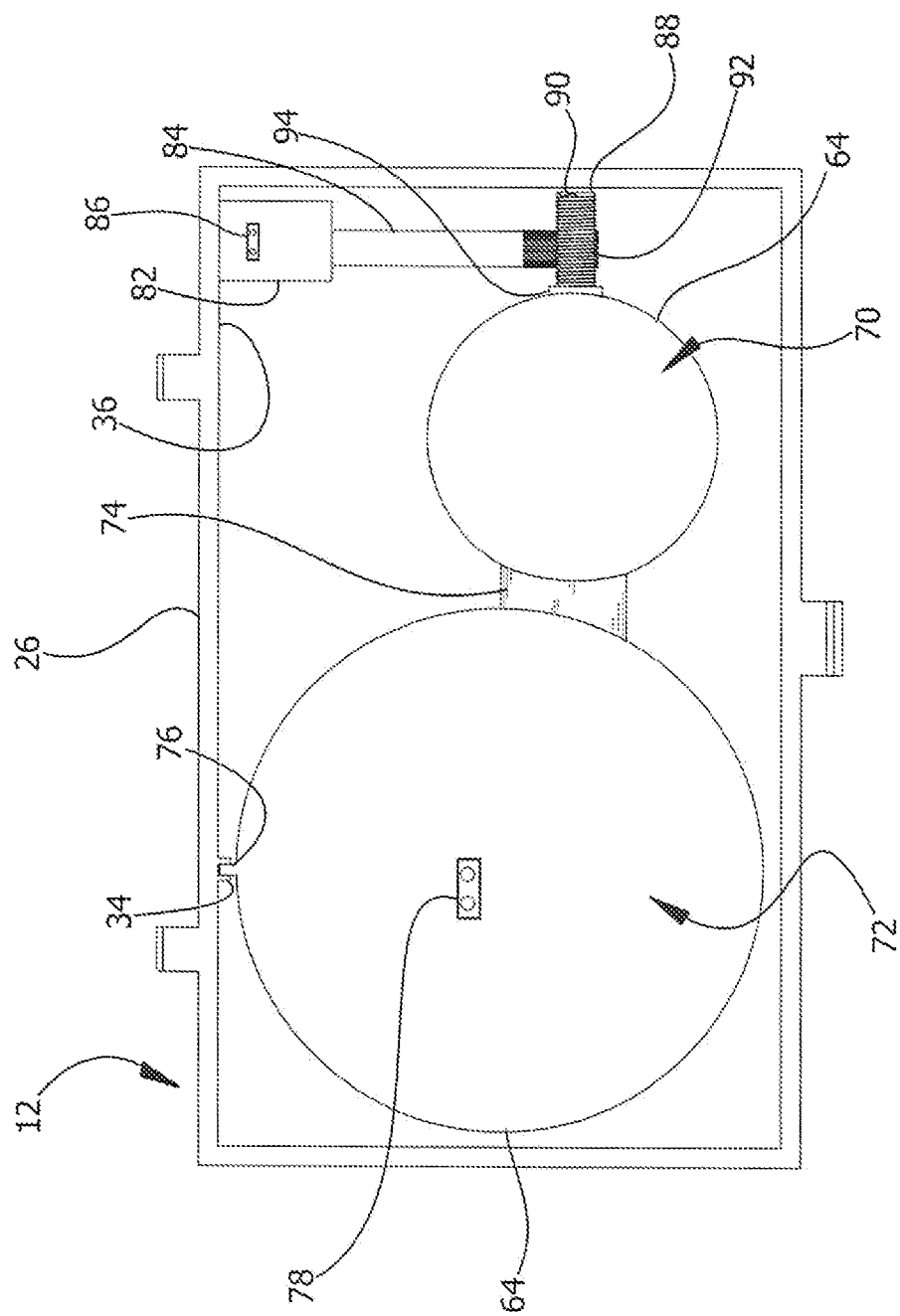
FIG. 3 is a back view of an embodiment of the disclosure.
Figure 4:
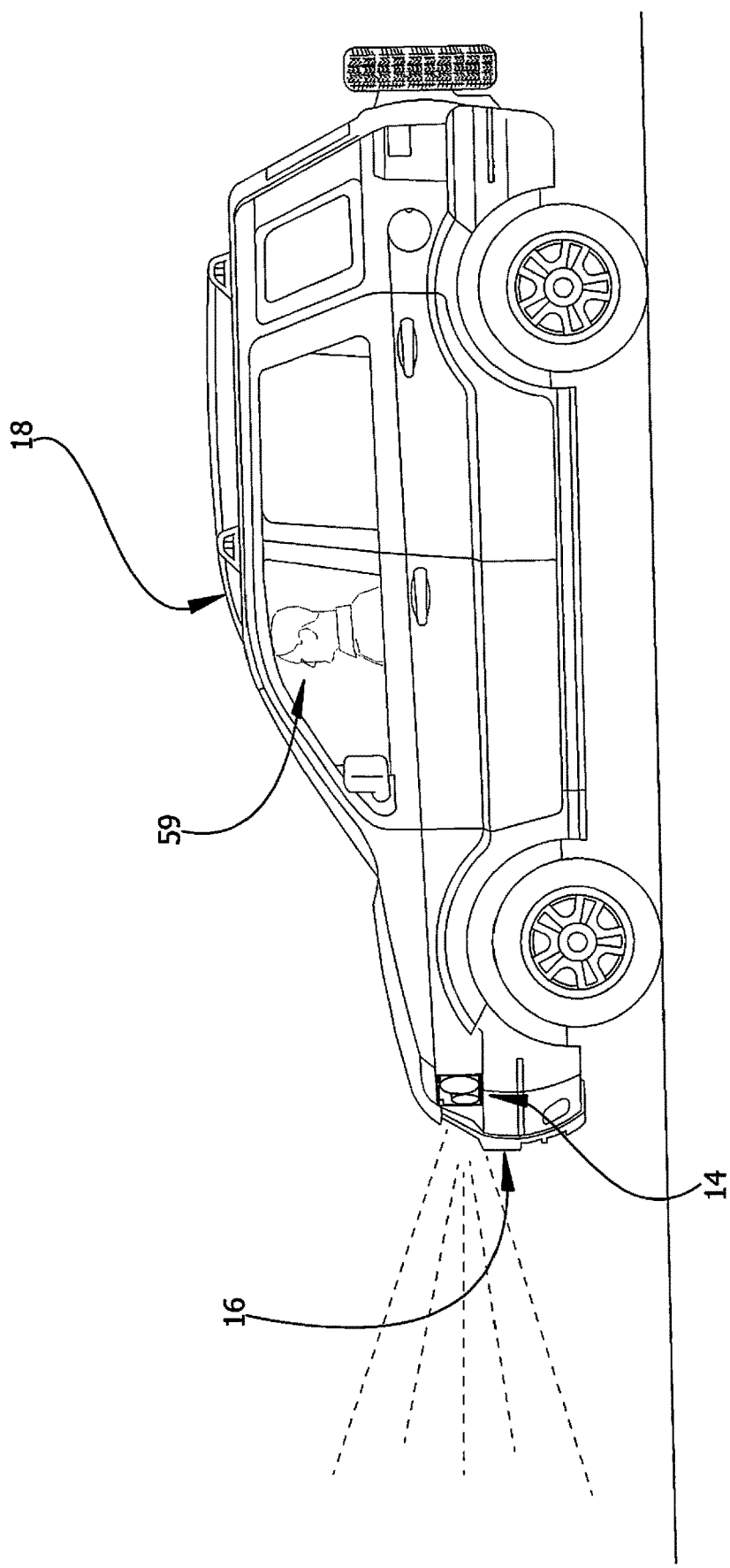
FIG. 4 is an in-use view of an embodiment of the disclosure showing a vehicle on a horizontal plane.
Figure 5:
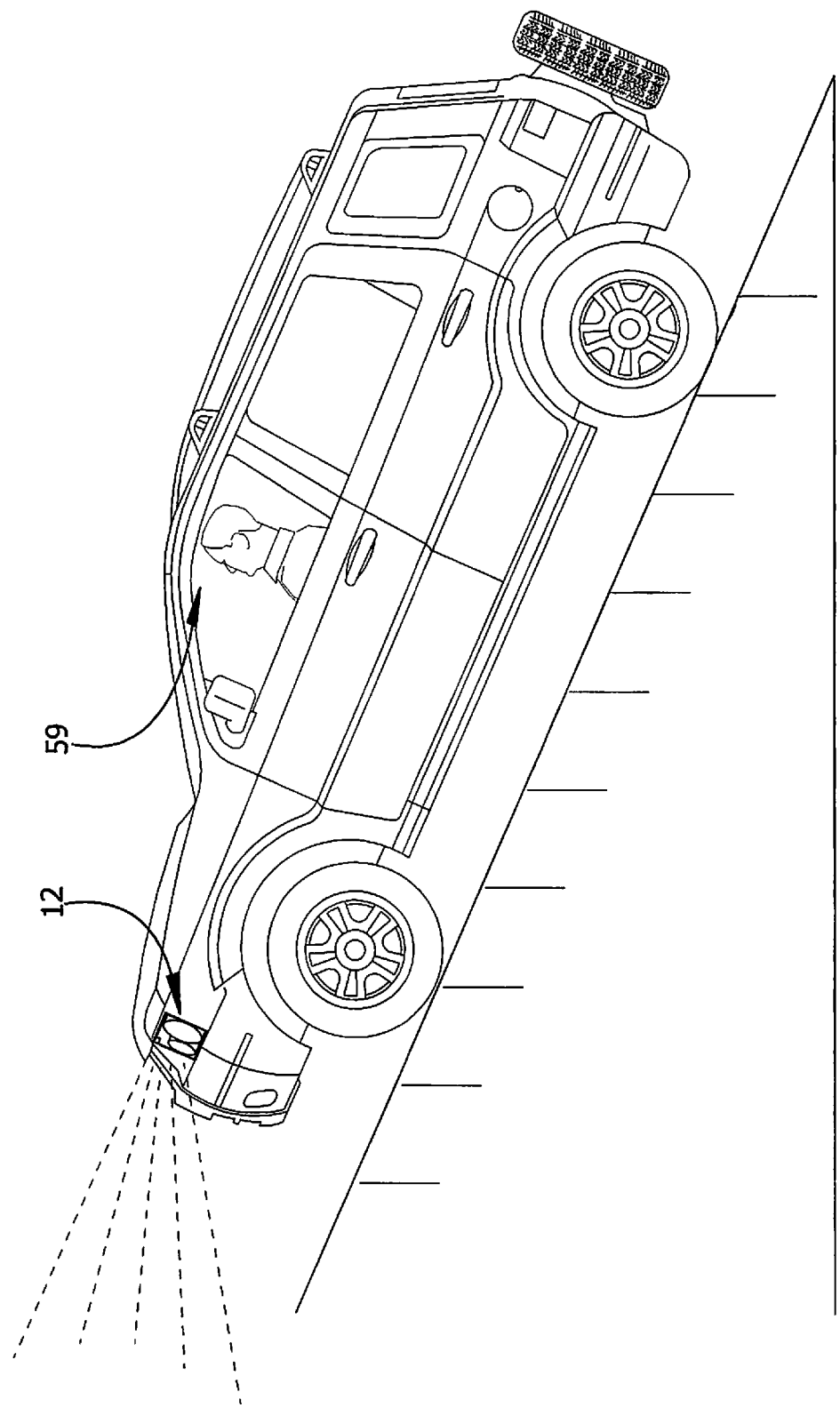
FIG. 5 is an in-use view of an embodiment of the disclosure showing a vehicle on an upward incline.
Figure 6:
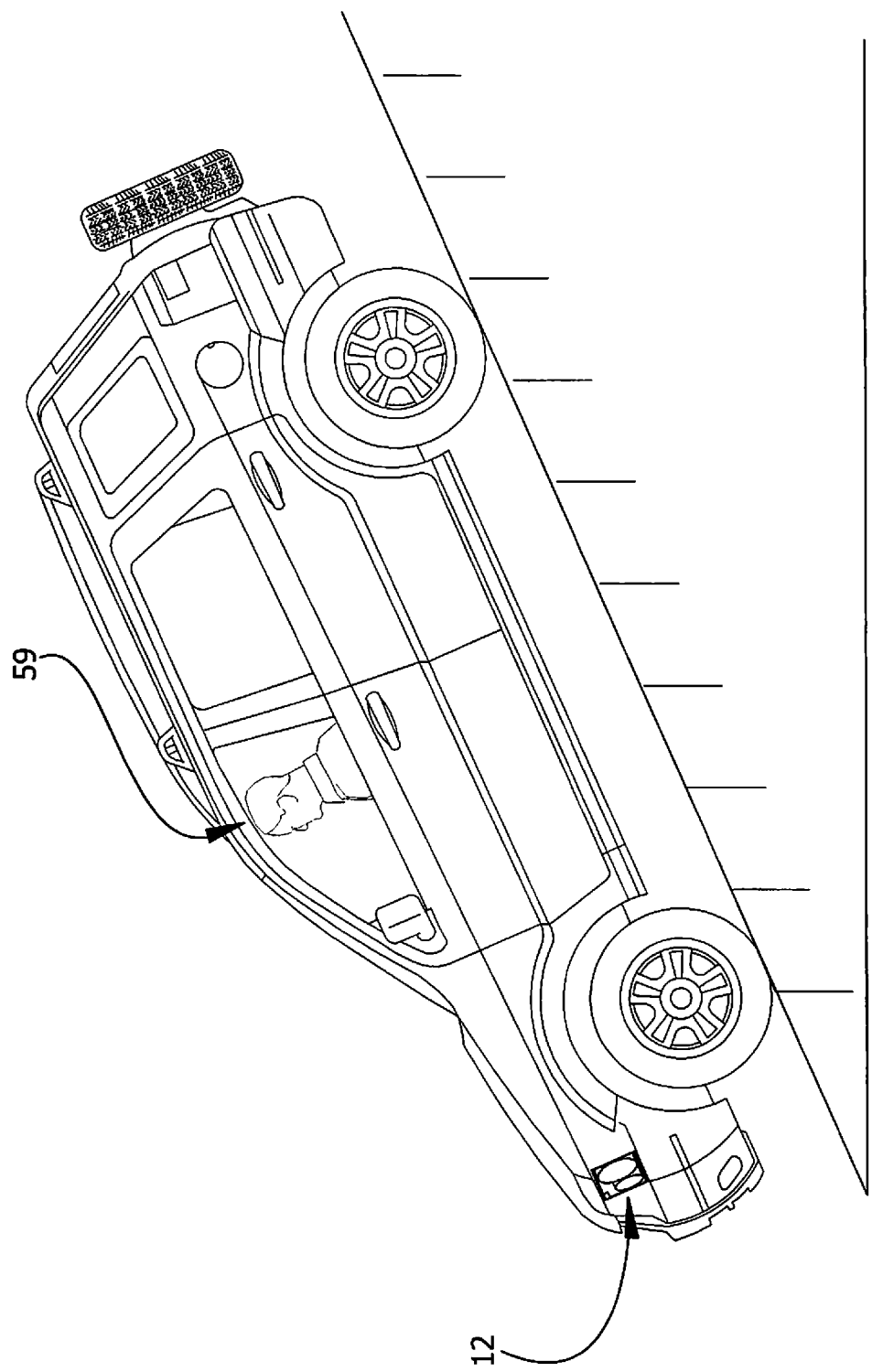
FIG. 6 is an in-use view of an embodiment of the disclosure showing a vehicle on a downward incline.
Figure 7:
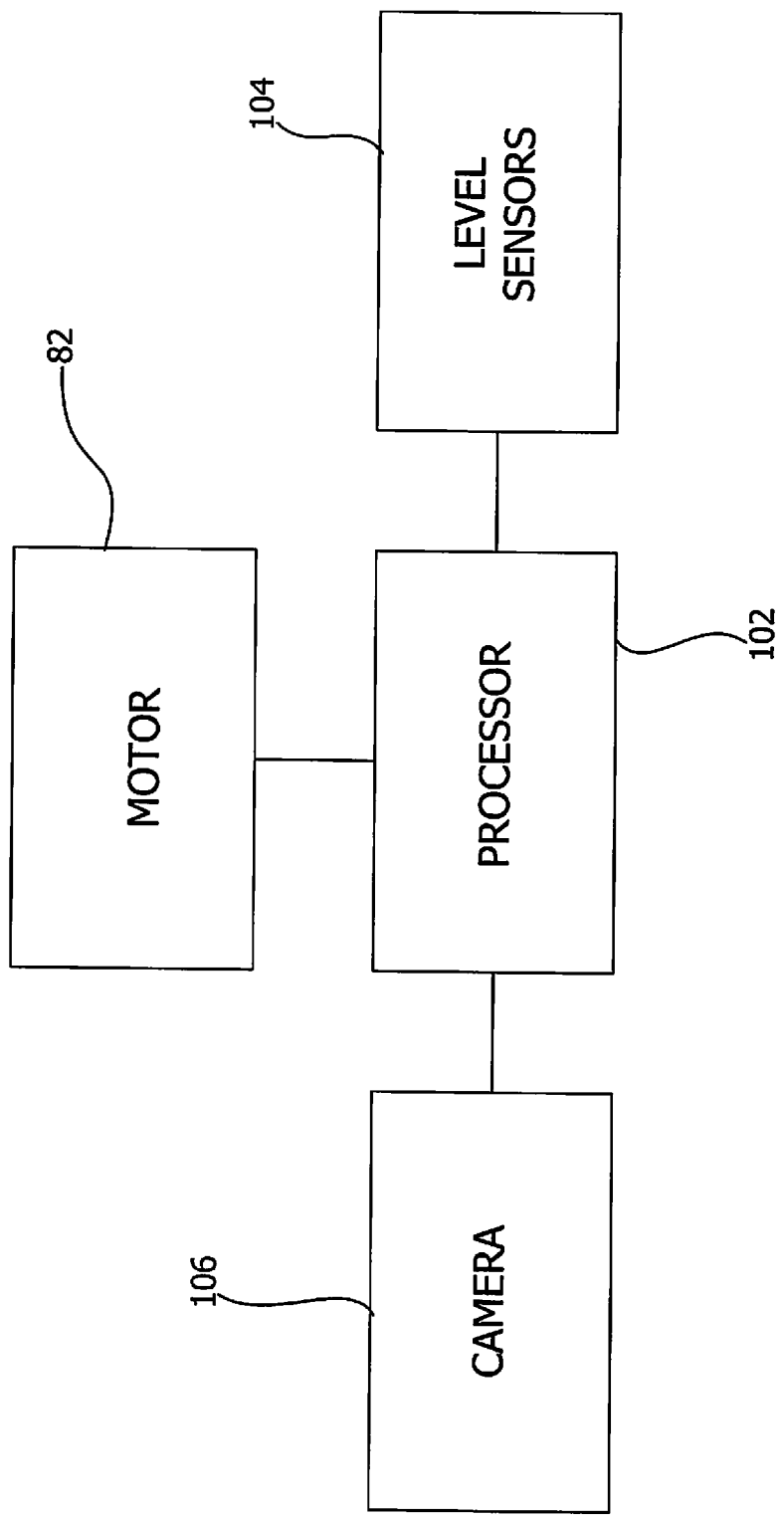
FIG. 7 is a schematic view of an embodiment of the disclosure.
Figure 8:
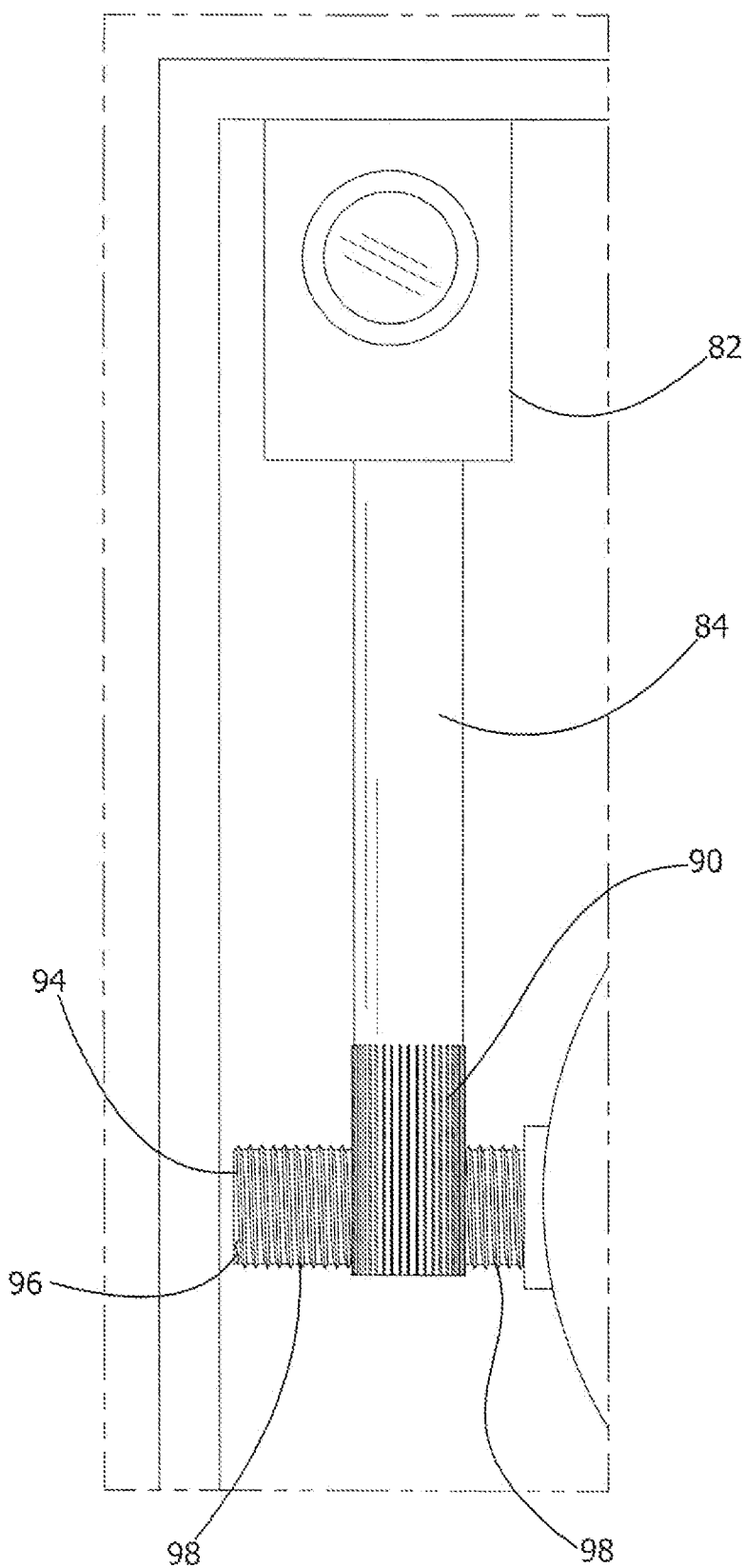
FIG. 8 is a right side cut-away view of an embodiment of the disclosure.

With reference now to the drawings, and in particular to FIGS. 1 through 8 thereof, a new headlight device embodying the principles and concepts of an embodiment of the disclosure and generally designated by the reference numeral 10 will be described.

As best illustrated in FIGS. 1 through 8, the adjustable headlight device 10 generally comprises a headlight housing 12 that is mountable in a headlight space 14 in a forward end 16 of a vehicle 18. The headlight housing 12 has a front end 20, a back end 22 and an outer wall 24 extending between the front end 20 and the back end 22; the outer wall 24 has a top side 26, a bottom side 28, a first lateral side 30 and a second lateral side 32. Additionally, each of the front end 20 and the back end 22 is open. The front end 20 corresponding to each of the top side 26 and the bottom side 28 curves forwardly from the back end 22 between the first lateral side 30 and the second lateral side 32 such that the first lateral side 30 has a width that is substantially greater than a width of the second lateral side 32.

The headlight housing 12 has a pivot point 34 which extends downwardly from a lower surface 36 of the top side 26 of the outer wall 24. The pivot point 34 is positioned closer to the second lateral side 32 of the outer wall 24 than the first lateral side 30 of the outer wall 24. A pair of top mounting tabs 38 each comprises a leg 40 extending upwardly from the top side 26 of the outer wall 24 and a foot 42 extending rearwardly from the leg 40. The leg 40 of each of the top mounting tabs 38 is aligned with the back end 22 of the headlight housing 12 such that the foot 42 is directed rearwardly beyond the back end 22. The foot 42 of each of the pair of top mounting tabs 38 has a hole 44 extending through the foot 42 for accommodating a fastener which engages the vehicle 18 for mounting the headlight housing 12 in the headlight space 14 in the forward end 16 of the vehicle 18. Each of the pair of top mounting tabs 38 is spaced from a respective one of the first lateral side 30 and the second lateral side 32 of the outer wall 24 of the headlight housing 12.

A bottom mounting tab 46 is provided which has a leg 48 extending downwardly from the bottom side 28 of the outer wall 24 of the headlight housing 12 and a foot 50 extending rearwardly from the leg 48 of the bottom mounting tab 46. The foot 50 of the bottom mounting tab 46 has a ridge 52 extending upwardly from a top surface 54 of the foot 50 of the bottom mounting tab 46. The ridge 52 releasably engages a retaining element in the headlight space 14 in the forward end 16 of the vehicle 18 for retaining the headlight housing 12 in the headlight space 14. The bottom mounting tab 46 is centrally located along the back end 22 of the headlight housing 12.

A pair of headlights 58 is included and each of the pair of headlights 58 is pivotally disposed within the headlight housing 12 thereby facilitating each of the pair of headlights 58 to be positioned at a variety of angles in the headlight housing 12. In this way each of the pair of headlights 58 can emit light from the forward end 16 of the vehicle 18 at a variety of angles thereby improving visibility of a driver 59 of the vehicle 18 while driving in a darkened environment. Additionally, each of the pair of headlights 58 is in electrical communication with each other. The vehicle 18 may be a passenger vehicle, a cargo vehicle or any other type of motorized vehicle that is commonly driven on public roadways. Additionally, each of the headlights 58 may comprise a halogen light, a light emitting diode or other type of electronic light that is approved for use with motorized vehicles that are driven on public roadways.

Each of the pair of headlights 58 includes a canister 60 which has a rear wall 62 and an exterior wall 64 extending forwardly from the rear wall 62. The exterior wall 64 of the canister 60 has a front edge 66 which defines an opening 68 into the canister 60. The front edge 66 is sloped along a plane which is oriented coplanar to the front end 20 of the headlight housing 12. The pair of headlights 58 includes a first headlight 70 and a second headlight 72.

The exterior wall 64 of the canister 60 of the first headlight 70 has a diameter that is less than a diameter of the canister 60 of the second headlight 72. The exterior wall 64 of the canister 60 of the first headlight 70 is attached to the canister 60 of the second headlight 72 at an attachment point 74 that is centrally positioned in the exterior wall 64 of the canister 60 of each of the first headlight 70 and the second headlight 72. The canister 60 of the second headlight 72 has a tab 76 extending upwardly from the exterior wall 64 of the canister 60 of the second headlight 72 at a point that is aligned with the rear wall 62 of the canister 60 of the second headlight 72. Additionally, the tab 76 is pivotally attached to the pivot point 34 on the top side 26 of the outer wall 24 of the headlight housing 12 thereby pivotally retaining each of the first headlight 70 and the second headlight 72 in the headlight housing 12. The canister 60 of the second headlight 72 has an input port 78 that is recessed into the rear wall 62 of the canister 60 of the second headlight 72 thereby facilitating the input port 78 to insertably receive an electrical connection of the vehicle 18 for powering the each of the first headlight 70 and the second headlight 72.

A tilting unit 80 is integrated into the headlight housing 12 and the tilting unit 80 is in mechanical communication with a respective one of the pair of headlights 58. The tilting unit 80 tilts each of the pair of headlights 58 upwardly or downwardly. In this way the pair of headlights 58 can emit light in a desired angle to optimize visibility for the driver 59. The tilting unit 80 comprises a motor 82 that is attached to the lower surface 36 of the top side 26 of the outer wall 24 of the headlight housing 12 at a point located adjacent to the first lateral side 30 of the outer wall 24 of the headlight housing 12.

The motor 82 has an output shaft 84 which is attached to motor 82. The motor 82 rotates the output shaft 84 in a first direction when the motor 82 is actuated to rotate in a first direction. Conversely, the motor 82 rotates the output shaft 84 in a second direction when the motor 82 is actuated to rotate in a second direction. The motor 82 may comprise a two direction electric motor or the like. The tilting unit 80 includes an input port 86 that is recessed into the motor 82 and is electrically coupled to the motor 82 thereby facilitating the input port 86 on the motor 82 to insertably receive an electrical connection for powering and controlling the motor 82. The tilting unit 80 includes a drive gear 88 that is attached to the output shaft 84. The drive gear 88 has an outside surface 90 comprising a plurality of teeth 92 evenly spaced apart from each other and distributed around a full circumference of the outside surface 90.

The tilting unit 80 includes a rail gear 94 that is integrated into the exterior wall 64 of the canister 60 of the first headlight 70. The rail gear 94 is elongated to extend substantially between the rear wall 62 of the canister 60 of the first headlight 70 and the front edge 66 of the exterior wall 64 of the canister 60 of the first headlight 70. Additionally, the rail gear 94 is oriented to extend along a line that is sloped downwardly between the rear wall 62 of the canister 60 of the first headlight 70 and the front edge 66 of the exterior wall 64 of the canister 60 of the first headlight 70. The rail gear 94 has an outwardly facing surface 96 comprising a plurality of teeth 98 evenly spaced apart from each other and distributed along a full length of the outwardly facing surface 96. The teeth 92 on the outside surface 90 of the drive gear 88 enmesh with the teeth 98 on the outwardly facing surface 96 of the rail gear 94. The drive gear 88 travels forwardly along the rail gear 94 when the motor 82 rotates in the first direction such that each of the first headlight 70 and the second headlight 72 is tilted downwardly. Conversely, the drive gear 88 travels rearwardly along the rail gear 94 when the motor 82 rotates in the second direction such that each of the first headlight 70 and the second headlight 72 is tilted upwardly.

A control unit 100 is integrated into the headlight housing 12 and the control unit 100 is in communication with the tilting unit 80. The control unit 100 senses an angle of the vehicle 18 with respect to a horizontal plane. The control unit 100 actuates the tilting unit 80 to tilt the pair of headlights 58 according to an angle of the vehicle 18 that is sensed by the control unit 100. In this way the tilting unit 80 facilitates the pair of headlights 58 to emit light downwardly onto a roadway 101 at an optimum angle for enhancing visibility of the driver 59.

The control unit 100 comprises a processor 102 that is integrated into the headlight housing 12. The processor 102 receives a tilt up input and a tilt down input and the processor 102 is electrically coupled to the motor 82. The motor 82 is actuated to rotate in the first direction when the processor 102 receives the tilt down input. Conversely, the motor 82 is actuated to rotate in the second direction when the processor 102 receives the tilt up input.

The control unit 100 includes a level sensor 104 that is integrated into the headlight housing 12 and the level sensor 104 is electrically coupled to the processor 102. The processor 102 receives the tilt down input when the level sensor 104 senses that the vehicle 18 is traveling at an upward angle. Conversely, the processor 102 receives the tilt up input when the level sensor 104 senses that the vehicle 18 is traveling at a downward angle. The level sensor 104 may comprise an electronic level sensor or a gravitational level sensor or any other type of level sensor that can determine the angle of the vehicle 18 with respect to a horizontal plane.

The control unit 100 includes a camera 106 which is integrated into the headlight housing 12 to capture imagery in front of the vehicle 18. The camera 106 is electrically coupled to the processor 102 and the processor 102 analyzes imagery captured by the camera 106. In this way the processor 102 can determine when the motor 82 has tilted the pair of headlights 58 at an optimum angle for illuminating the roadway upon which the vehicle 18 is travelling. Furthermore, the processor 102 de-actuates the motor 82 when the processor 102 determines that the motor 82 has tilted the pair of headlights 58 at the optimum angle. The camera 106 may comprise a digital video camera or other type of electronic camera.

In use, the level sensor 104 determines the angle of the vehicle 18 and the tilting unit 80 tilts the headlights 58 until the camera 106 facilitates the control unit 100 to determine the optimum positioning of the headlights 58. In this way the headlights 58 are continuously tilted to illuminate the roadway 101 upon which the vehicle 18 is travelling to optimize the driver's 59 visibility whether the vehicle 18 is travelling upwardly or downwardly along an incline. Additionally, the control unit 100 tilts the headlights 58 downwardly to optimally illuminate the roadway 101 in the event that the vehicle 18 has an elevated suspension which positions the headlights 58 at a height that would otherwise direct light from the headlights 58 directly into oncoming traffic.

With respect to the above description then, it is to be realized that the optimum dimensional relationships for the parts of an embodiment enabled by the disclosure, to include variations in size, materials, shape, form, function and manner of operation, device and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. An adjustable headlight device for automatically adjusting the angle of light emitted from a vehicle under various driving conditions, said device comprising:
   a headlight housing being mountable in a headlight space in a forward end of a vehicle;
   a pair of headlights, each of said pair of headlights being pivotally disposed within said headlight housing thereby facilitating each of said pair of headlights to be positioned at a variety of angles in said headlight housing wherein each of said pair of headlights is configured to emit light from said forward end of said vehicle at a variety of angles thereby improving visibility of a driver of said vehicle while driving in a darkened environment, each of said pair of headlights being in electrical communication with each other;
   a tilting unit being integrated into said headlight housing, said tilting unit being in mechanical communication with a respective one of said pair of headlights, said tilting unit tilting each of said pair of headlight upwardly or downwardly wherein said pair of headlights is configured to emit light in a desired angle to optimize visibility for the driver;
   a control unit being integrated into said headlight housing, said control unit being in communication with said tilting unit, said control unit sensing an angle of said vehicle with respect to a horizontal plane, said control unit actuating said tilting unit to tilt said pair of headlights according to an angle of said vehicle that is sensed by said control unit wherein said tilting unit is configured to facilitate said pair of headlights to emit light downwardly onto a roadway at an optimum angle for enhancing visibility of the driver;
   wherein said headlight housing has a front end, a back end and an outer wall extending between said front end and said back end;
   wherein said outer wall has a top side and a bottom side and a first lateral side and a second lateral side;
   wherein each of said front end and said back end is open;
   wherein said front end corresponding to each of said top side and said bottom side curves forwardly from said back end between said first lateral side and said second lateral side such that said first lateral side has a width being substantially greater than a width of said second lateral side;
   wherein said headlight housing has a pivot point extending downwardly from a lower surface of said top side of said outer wall; and
   wherein said pivot point is positioned closer to said second lateral side of said outer wall than said first lateral side of said outer wall.

2. The device according to claim 1, wherein:
   said device includes a pair of top mounting tabs each comprising a leg extending upwardly from said top side of said outer wall and a foot extending rearwardly from said leg;
   said leg of each of said top mounting tabs is aligned with said back end of said headlight housing such that said foot is directed rearwardly beyond said back end;
   said foot of each of said pair of top mounting tabs has a hole extending through said foot for accommodating a fastener which engages the vehicle for mounting said headlight housing in said headlight space in said forward end of said vehicle; and each of said pair of top mounting tabs is spaced from a respective one of said first lateral side and said second lateral side of said outer wall of said headlight housing.

3. The device according to claim 1, wherein:

said device includes a bottom mounting tab having a leg extending downwardly from said bottom side of said outer wall of said headlight housing and a foot extending rearwardly from said leg of said bottom mounting tab;

said foot of said bottom mounting tab has a ridge extending upwardly from a top surface of said foot of said bottom mounting tab for releasably engaging a retaining element in said headlight space in said forward end of said vehicle for retaining said headlight housing in said headlight space; and said bottom mounting tab is centrally located along said back end of said headlight housing.

4. The device according to claim 1, wherein:

each of said pair of headlights includes a canister which has a rear wall and an exterior wall extending forwardly from said rear wall;

said exterior wall of said canister has a front edge defining an opening into said canister; and said front edge is sloped along a plane being oriented coplanar to said front end of said headlight housing.

5. The device according to claim 4, wherein:

said pair of headlights includes a first headlight and a second headlight;

said exterior wall of said canister of said first headlight has a diameter being less than a diameter of said canister of said second headlight; and said exterior wall of said canister of said first headlight is attached to said canister of said second headlight at an attachment point being centrally positioned in said exterior wall of said canister of each of said first headlight and said second headlight.

6. The device according to claim 5, wherein:

said canister of said second headlight has a tab extending upwardly from said exterior wall of said canister of said second headlight at a point being aligned with said rear wall of said canister of said second headlight;

said tab is pivotally attached to said pivot point on said top side of said outer wall of said headlight housing thereby pivotally retaining each of said first headlight and said second headlight in said headlight housing; and said canister of said second headlight has an input port being recessed into said rear wall of said canister of said second headlight thereby facilitating said input port to insertably receive an electrical connection of said vehicle for powering said each of said first headlight and said second headlight.

7. The device according to claim 1, wherein said tilting unit comprises:

a motor being attached to said lower surface of said top side of said outer wall of said headlight housing at a point located adjacent to said first lateral side of said outer wall of said headlight housing, said motor having an output shaft being attached to motor, said motor rotating said output shaft in a first direction when said motor is actuated to rotate in a first direction, said motor rotating said output shaft in a second direction when said motor is actuated to rotate in a second direction;

an input port being recessed into said motor and being electrically coupled to said motor thereby facilitating said input port on said motor to insertably receive an electrical connection for powering and controlling said motor; and a drive gear being attached to said output shaft, said drive gear having an outside surface comprising a plurality of teeth being evenly spaced apart from each other and being distributed around a full circumference of said outside surface.

8. The device according to claim 7, wherein:

each of said pair of headlights includes a canister having a rear wall and an exterior wall, said exterior wall having a front edge, said pair of headlights includes a first headlight and a second headlight;

said titling unit includes a rail gear being integrated into said exterior wall of said canister of said first headlight;

said rail gear is elongated to extend substantially between said rear wall of said canister of said first headlight and said front edge of said exterior wall of said canister of said first headlight;

said rail gear is oriented to extend along a line being sloped downwardly between said rear wall of said canister of said first headlight and said front edge of said exterior wall of said canister of said first headlight; and said rear gear has an outwardly facing surface comprising a plurality of teeth being evenly spaced apart from each other and being distributed along a full length of said outwardly facing surface.

9. The device according to claim 8, wherein:

said tilting unit includes a motor and a drive gear attached to said motor, said drive gear having an outside surface comprising a plurality of teeth;

said teeth on said outside surface of said drive gear enmesh with said teeth on said outwardly facing surface of said rail gear;

said drive gear travels forwardly along said rail gear when said motor rotates in a first direction such that each of said first headlight and said second headlight is tilted downwardly; and said drive gear travels rearwardly along said rail gear when said motor rotates in a second direction such that each of said first headlight and said second headlight is tilted upwardly.

10. The device according to claim 9, wherein:

said control unit comprises a processor being integrated into said headlight housing;

said processor receives a tilt up input and a tilt down input;

said processor is electrically coupled to said motor;

said motor is actuated to rotate in said first direction when said processor receives said tilt down input;

said motor is actuated to rotate in said second direction when said processor receives said tilt up input; and said control unit includes a level sensor being integrated into said headlight housing;

said level sensor is electrically coupled to said processor;

said processor receives said tilt down input when said level sensor senses that said vehicle is traveling at an upward angle; and said processor receives said tilt up input when said level sensor senses that said vehicle is traveling at a downward angle.

11. The device according to claim 10, wherein:

said control unit includes a camera being integrated into said headlight housing wherein said camera is configured to capture imagery in front of said vehicle;

said camera is electrically coupled to said processor;

said processor analyzes imagery captured by said camera thereby facilitating said processor to determine when said motor has positioned said tilted said pair of headlights at an optimum angle for illuminating the roadway upon which said vehicle is travelling; and said processor de-actuates said motor when said processor determines that said motor has tilted said pair of headlights at said optimum angle.

12. An adjustable headlight device for automatically adjusting the angle of light emitted from a vehicle under various driving conditions, said device comprising:

a headlight housing being mountable in a headlight space in a forward end of a vehicle, said headlight housing having a front end, a back end and an outer wall extending between said front end and said back end, said outer wall having a top side and a bottom side and a first lateral side and a second lateral side, each of said front end and said back end being open, said front end corresponding to each of said top side and said bottom side curving forwardly from said back end between said first lateral side and said second lateral side such that said first lateral side has a width being substantially greater than a width of said second lateral side, said headlight housing having a pivot point extending downwardly from a lower surface of said top side of said outer wall, said pivot point being positioned closer to said second lateral side of said outer wall than said first lateral side of said outer wall;

a pair of top mounting tabs each comprising a leg extending upwardly from said top side of said outer wall and a foot extending rearwardly from said leg, said leg of each of said top mounting tabs being aligned with said back end of said headlight housing such that said foot is directed rearwardly beyond said back end, said foot of each of said pair of top mounting tabs having a hole extending through said foot for accommodating a fastener which engages the vehicle for mounting said headlight housing in said headlight space in said forward end of said vehicle, each of said pair of top mounting tabs being spaced from a respective one of said first lateral side and said second lateral side of said outer wall of said headlight housing;

a bottom mounting tab having a leg extending downwardly from said bottom side of said outer wall of said headlight housing and a foot extending rearwardly from said leg of said bottom mounting tab, said foot of said bottom mounting tab having a ridge extending upwardly from a top surface of said foot of said bottom mounting tab for releasably engaging a retaining element in said headlight space in said forward end of said vehicle for retaining said headlight housing in said headlight space, said bottom mounting tab being centrally located along said back end of said headlight housing;

a pair of headlights, each of said pair of headlights being pivotally disposed within said headlight housing thereby facilitating each of said pair of headlights to be positioned at a variety of angles in said headlight housing wherein each of said pair of headlights is configured to emit light from said forward end of said vehicle at a variety of angles thereby improving visibility of a driver of said vehicle while driving in a darkened environment, each of said pair of headlights being in electrical communication with each other, each of said pair of headlights including a canister which has a rear wall and an exterior wall extending forwardly from said rear wall, said exterior wall of said canister having a front edge defining an opening into said canister, said front edge being sloped along a plane being oriented coplanar to said front end of said headlight housing, said pair of headlights including a first headlight and a second headlight, said exterior wall of said canister of said first headlight having a diameter being less than a diameter of said canister of said second headlight, said exterior wall of said canister of said first headlight being attached to said canister of said second headlight at an attachment point being centrally positioned in said exterior wall of said canister of each of said first headlight and said second headlight, said canister of said second headlight having a tab extending upwardly from said exterior wall of said canister of said second headlight at a point being aligned with said rear wall of said canister of said second headlight, said tab being pivotally attached to said pivot point on said top side of said outer wall of said headlight housing thereby pivotally retaining each of said first headlight and said second headlight in said headlight housing, said canister of said second headlight having an input port being recessed into said rear wall of said canister of said second headlight thereby facilitating said input port to insertably receive an electrical connection of said vehicle for powering said each of said first headlight and said second headlight;

a tilting unit being integrated into said headlight housing, said tilting unit being in mechanical communication with a respective one of said pair of headlights, said tilting unit tilting each of said pair of headlight upwardly or downwardly wherein said pair of headlights is configured to emit light in a desired angle to optimize visibility for the driver, said tilting unit comprising:

a motor being attached to a lower surface of said top side of said outer wall of said headlight housing at a point located adjacent to said first lateral side of said outer wall of said headlight housing, said motor having an output shaft being attached to motor, said motor rotating said output shaft in a first direction when said motor is actuated to rotate in a first direction, said motor rotating said output shaft in a second direction when said motor is actuated to rotate in a second direction;

an input port being recessed into said motor and being electrically coupled to said motor thereby facilitating said input port on said motor to insertably receive an electrical connection for powering and controlling said motor;

a drive gear being attached to said output shaft, said drive gear having an outside surface comprising a plurality of teeth being evenly spaced apart from each other and being distributed around a full circumference of said outside surface;

a rail gear being integrated into said exterior wall of said canister of said first headlight, said rail gear being elongated to extend substantially between said rear wall of said canister of said first headlight and said front edge of said exterior wall of said canister of said first headlight, said rail gear being oriented to extend along a line being sloped downwardly between said rear wall of said canister of said first headlight and said front edge of said exterior wall of said canister of said first headlight, said rear gear having an outwardly facing surface comprising a plurality of teeth being evenly spaced apart from each other and being distributed along a full length of said outwardly facing surface, said teeth on said outside surface of said drive gear enmeshing with said teeth on said outwardly facing surface of said rail gear, said drive gear travelling forwardly along said rail gear when said motor rotates in said first direction such that each of said first headlight and said second headlight is tilted downwardly, said drive gear travelling rearwardly along said rail gear when said motor rotates in said second direction such that each of said first headlight and said second headlight is tilted upwardly; and a control unit being integrated into said headlight housing, said control unit being in communication with said tilting unit, said control unit sensing an angle of said vehicle with respect to a horizontal plane, said control unit actuating said tilting unit to tilt said pair of headlights according to an angle of said vehicle that is sensed by said control unit wherein said tilting unit is configured to facilitate said pair of headlights to emit light downwardly onto a roadway at an optimum angle for enhancing visibility of the driver, said control unit comprising:

a processor being integrated into said headlight housing, said processor receiving a tilt up input and a tilt down input, said processor being electrically coupled to said motor, said motor being actuated to rotate in said first direction when said processor receives said tilt down input, said motor being actuated to rotate in said second direction when said processor receives said tilt up input;

a level sensor being integrated into said headlight housing, said level sensor being electrically coupled to said processor, said processor receiving said tilt down input when said level sensor senses that said vehicle is traveling at an upward angle, said processor receiving said tilt up input when said level sensor senses that said vehicle is traveling at a downwardly angle; and a camera being integrated into said headlight housing wherein said camera is configured to capture imagery in front of said vehicle, said camera being electrically coupled to said processor, said processor analyzing imagery captured by said camera thereby facilitating said processor to determine when said motor has positioned said tilted said pair of headlights at an optimum angle for illuminating the roadway upon which said vehicle is travelling, said processor de-actuating said motor when said processor determines that said motor has tilted said pair of headlights at said optimum angle.

* * * * *